(12) United States Patent
Nammi et al.

(10) Patent No.: US 12,177,020 B2
(45) Date of Patent: Dec. 24, 2024

(54) METHOD TO DECODE UPLINK CONTROL CHANNEL FOR ULTRA RELIABLE LOW LATENCY APPLICATIONS

(71) Applicant: Telefonaktiebolaget LM Ericsson (publ), Stockholm (SE)

(72) Inventors: Sairamesh Nammi, Kista (SE); Thomas Chapman, Solna (SE); Namir Lidian, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 339 days.

(21) Appl. No.: 17/764,837

(22) PCT Filed: Oct. 5, 2020

(86) PCT No.: PCT/EP2020/077815
§ 371 (c)(1),
(2) Date: Mar. 29, 2022

(87) PCT Pub. No.: WO2021/064237
PCT Pub. Date: Apr. 8, 2021

(65) Prior Publication Data
US 2022/0329357 A1     Oct. 13, 2022

Related U.S. Application Data

(60) Provisional application No. 62/910,737, filed on Oct. 4, 2019.

(51) Int. Cl.
*H04W 72/04*     (2023.01)
*H04L 1/1607*    (2023.01)
(Continued)

(52) U.S. Cl.
CPC .......... *H04L 1/1642* (2013.01); *H04L 1/1812* (2013.01); *H04L 5/0053* (2013.01)

(58) Field of Classification Search
CPC ..... H04L 5/0044; H04L 5/006; H04L 1/1893; H04W 4/40; H04W 92/18; H04W 4/46
See application file for complete search history.

(56) References Cited

U.S. PATENT DOCUMENTS

| | | | |
|---|---|---|---|
| 2010/0039926 A1 | 2/2010 | Zhang et al. | |
| 2010/0042881 A1* | 2/2010 | Wong | H04L 1/0045 |
| | | | 714/748 |
| 2022/0141846 A1* | 5/2022 | Lee | H04W 72/1263 |
| | | | 370/329 |

FOREIGN PATENT DOCUMENTS

| | | | | |
|---|---|---|---|---|
| EP | 1440525 B1 | 9/2012 | | |
| WO | WO-2019028835 A1 * | 2/2019 | | H04L 1/12 |

OTHER PUBLICATIONS

International Search Report and Written Opinion dated Jan. 21, 2021 for International Application No. PCT/EP2020/077815 filed Oct. 5, 2020, consisting of 10 pages.

* cited by examiner

*Primary Examiner* — Maharishi V Khirodhar
(74) *Attorney, Agent, or Firm* — Weisberg I.P. Law, P.A.

(57) ABSTRACT

A method, system and apparatus are disclosed. In one or more embodiments, a network node is configured to communicate with a wireless device (WD). The network node configured to, and/or comprising a radio interface and/or comprising processing circuitry configured to determine if a detected sequence meets one of an acknowledgement (ACK) criterion and negative-acknowledgement (NACK) criterion using at least one bias value where the at least one bias value is based at last in part on a type of service associated with the detected sequence.

24 Claims, 7 Drawing Sheets

(51) Int. Cl.
*H04L 1/1812* (2023.01)
*H04L 5/00* (2006.01)
*H04W 76/00* (2018.01)
*H04W 88/08* (2009.01)

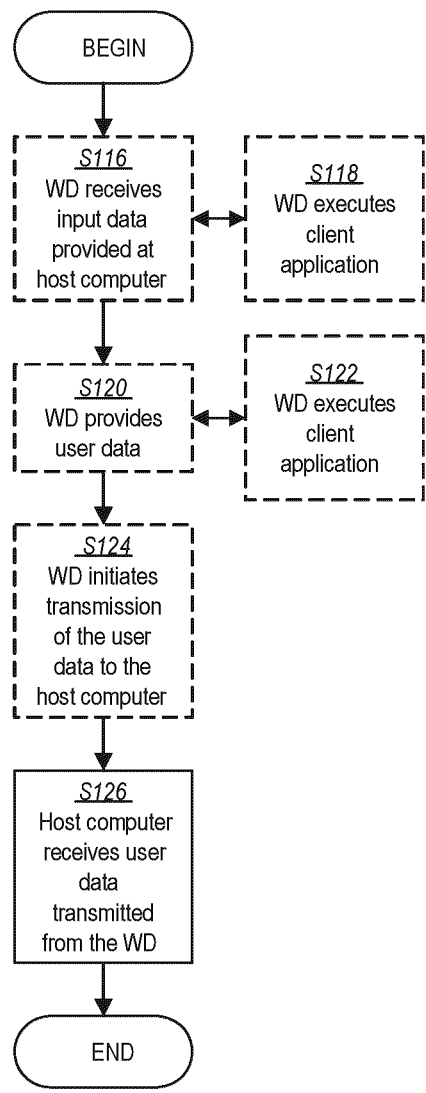 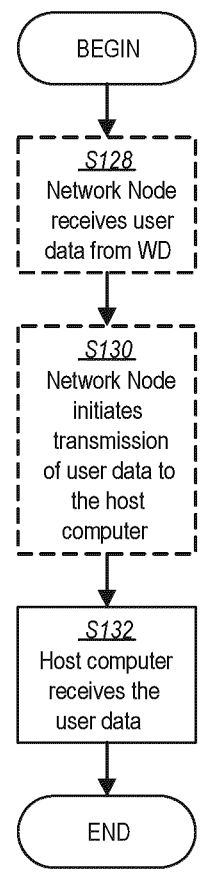
FIG. 6
FIG. 7

METHOD TO DECODE UPLINK CONTROL CHANNEL FOR ULTRA RELIABLE LOW LATENCY APPLICATIONS

CROSS-REFERENCE TO RELATED APPLICATIONS

This application is a Submission Under 35 U.S.C. § 371 for U.S. National Stage Patent Application of International Application No.: PCT/EP2020/077815, filed Oct. 5, 2020 entitled "METHOD TO DECODE UPLINK CONTROL CHANNEL FOR ULTRA RELIABLE LOW LATENCY APPLICATIONS," which claims priority to U.S. Provisional Application No.: 62/910,737, filed Oct. 4, 2019, entitled "METHOD TO DECODE UPLINK CONTROL CHANNEL FOR ULTRA RELIABLE LOW LATENCY APPLICATIONS," the entireties of both of which are incorporated herein by reference.

FIELD

The present disclosure relates to wireless communications, and in particular, to hybrid automatic repeat request (HARQ) detection and/or processing using at least one bias value based at least in part on at least one type of service.

BACKGROUND

A Third Generation Partnership Project (3GPP, a standardization organization) project specified as $5^{th}$ Generation (5G) also called New Radio (NR) access is being developed in order to help meet the huge demand for data-centric applications. Below is a list of some possible requirements for 5G networks:
  Data rates of several tens of megabits per second may be supported for tens of thousands of wireless devices;
  1 gigabit per second to be may be offered simultaneously to tens of wireless devices on the same office floor;
  Several hundreds of thousands of simultaneous wireless connections may be supported for massive sensor deployments;
  Spectral efficiency may be significantly enhanced compared to $4^{th}$ Generation (4G, also referred to as Long Term Evolution (LTE));
  Wireless coverage may be improved;
  Signaling efficiency may be enhanced; and
  Latency should be reduced significantly compared to LTE. From a services aspect, NR may support the following three services:
  Evolved mobile broadband (eMBB): This service may be used for high broadband applications where the data rate is the main criteria.
  Ultra reliable low latency communications (URLLC): This service may be used for ultra-reliable communications where the packet error rate of 10^(−6) may be required with less or minimal delay.
  Machine type communications (mMTC): This service may be used for connecting machine type of communications, where the number of devices is main criteria.

Message Sequence Chart for Downlink Data Transfer

FIG. 1 is a signaling diagram of a typical message sequence for downlink data transfer in 5G systems. From the pilot or reference signals, the wireless device may compute the channel estimates and then compute the parameters that may be needed for channel state information (CSI) reporting. The CSI report consists of at least one of, for example, channel quality indicator (CQI), precoding matrix index (PMI), rank information (RI), CSI-RS Resource Indicator (CRI) (CRI being the same as beam indicator), etc.

The CSI report is sent to the network node via a feedback channel either on request from the network node aperiodically or configured to report periodically. The network node scheduler uses this information in choosing the parameters for scheduling of this particular wireless device. The network node sends the scheduling parameters to the wireless device in the downlink control channel. After the scheduling parameters have been sent, actual data transfer takes place from network node to the wireless device.

Downlink Reference Signals

Downlink reference signals are predefined signals occupying specific resource elements within the downlink time-frequency grid. There are several types of downlink reference signals that are transmitted in different ways and used for different purposes by the receiving entity such as a wireless device, including for example:
  CSI reference signals (CSI-RS): These reference signals are specifically intended to be used by entities such as wireless devices to acquire channel-state information (CSI) and beam specific information (beam reference signal received power, (RSRP)). In 5G, CSI-RS is wireless device specific so it can have a significantly lower time/frequency density.
  Demodulation reference signals (DM-RS): These reference signals may be referred to as wireless device-specific reference signals and may be specifically intended to be used by wireless devices for channel estimation of a data channel. The label "wireless device-specific" relates to the fact that each demodulation reference signal is intended for channel estimation by a single wireless device. That specific reference signal is then only transmitted within the resource blocks assigned for data traffic channel transmission to that wireless device.
  Uplink Control Channel: The physical uplink control channel (PUCCH) carries information about hybrid automatic repeat request acknowledgement (HARQ-ACK) information corresponding to the downlink data transmission, scheduling requests indicating that a wireless device needs uplink resources for physical uplink shared channel (PUSCH) transmission and channel state information. The channel state information typically consists of L1-RSRP, CRI, RI, CQI, and PMI.
  Downlink Control Channel: The physical downlink control channel (PDCCH) carries information about the scheduling grants on downlink control information (DCI). Typically, this includes a number of scheduled MIMO layers, transport block sizes, modulation for each codeword, parameters related to HARQ, sub band locations and also PMI corresponding to that sub bands. All DCI formats may not transmit all the information as shown above, in general the contents of PDCCH depends on transmission mode and DCI format.

PUCCH Formats in NR

3GPP NR defines 5 PUCCH formats for reporting HARQ-ACK, SR and CSI. Table 1 (below) summarizes the characteristics of each PUCCH format. Formats 1 and 2 may only be used for sending HARQ-ACK. Long PUCCH formats are used for HARQ-ACK, CSI.

TABLE 1

| Format Name | Alternative name | Symbol length | Waveform | Information |
| --- | --- | --- | --- | --- |
| Format 0 | Short PUCCH <=2 bits | 1-2 | CP-OFDM | HARQ-ACK, SR |
| Format 1 | Long PUCCH <=2 bits | 4-14 | CP-OFDM | HARQ-ACK, SR |
| Format 2 | Short PUCCH >2 bits | 1-2 | CP-OFDM | CSI |
| Format 3 | Long PUCCH >2 bits | 4-14 | DFT-s-OFDM | CSI |
| Format 4 | Long PUCCH >2 bits | 4-14 | DFT-s-OFDM | CSI |

Once the network node decodes the uplink control channel, i.e., PUCCH, the network node may determine whether the wireless device transmitted HARQ-ACK or HARQ-NACK. Since contents of PUCCH formats 0 and 1 are not cyclic redundancy check (CRC) protected, the network node may need to use robust mechanism to determine HARQ-ACK or HARQ-NACK. However, since the channel and interference vary randomly, there is a possibility of mis detection. Mis detection occurs, for example, if the wireless device sends a HARQ-ACK and the network node detects it as HARQ-NACK, which may cause an unnecessary retransmission that wastes network resources. In another example, if the wireless device sends a HARQ-NACK and the network node detects it as a HARQ-ACK then the network node may not perform any retransmissions which may cause to block errors. Hence, the consequence of probability of mis detection may be severe for URLLC as the network node needs to try to ensure high reliable transmission at the same time within low latency for software applications and/or transmissions.

SUMMARY

Some embodiments advantageously provide methods, systems, and apparatuses for HARQ detection (or detection of signaling) and/or processing using at least one bias value based at least in part on at least one type of service.

In this disclosure, in some embodiments, PUCCH format 0 and 1 are employed. In one or more embodiments described herein, a method is proposed to detect the uplink control channel which is serving both eMBB and URLLC services, i.e., service two different service types with different transmission and/or reliability requirements. In the method described herein, instead of using conventional detection schemes such as a correlation detector using MMSE/MRC detector, the network node uses a biased detector where the bias depends (i.e., is a function of or is based at least in part) on the type of service used and uses one bias for HARQ-ACK and another bias for HARQ-NACK detection.

Therefore, in one or more embodiments, the solution described herein allows for better utilization of network resources as it minimizes the probability of mis detection when the network uses URLLC as well as eMBB data service.

According to one aspect, a network node is configured to communicate with a wireless device (WD). The network node includes processing circuitry configured to determine if a detected sequence meets one of an acknowledgement (ACK) criterion and negative-acknowledgement (NACK) criterion using at least one bias value, the at least one bias value being based at last in part on a type of service associated with the detected sequence.

According to this aspect, in some embodiments, the at least one bias value includes an ACK bias value and a NACK bias value, where the ACK bias value is greater than the NACK bias value. In some embodiments, the at least one bias value includes a first ACK bias value for a first service, a first NACK bias value for the first service, a second ACK bias value for a second service and a second NACK bias value for the second service, the first ACK bias value being greater than the second ACK bias value, and the second ACK bias value being greater than the second NACK bias value. In some embodiments, the at least one bias value includes a first ACK bias value for a first service, a first NACK bias value for the first service, a second ACK bias value for a second service and a second NACK bias value for the second service, the first ACK bias value being greater than the first NACK bias value, and the first NACK bias value being greater than the second NACK bias value. In some embodiments, the first service is URLLC and the second service is eMBB. In some embodiments, the ACK criterion is $Z_{ack} > Z_{Nack} + \delta_1$ and the NACK criterion is $Z_{Nack} > Z_{ack} + \delta_2$, where $\delta_1$ is the ACK bias value, $\delta_2$ is the NACK bias value, $Z_{ack}$ is a detected sequence correlated with a HARQ-ACK sequence and the received sequence, and $Z_{Nack}$ is a detected sequence correlated with a HARQ-NACK sequence and the received sequence. In some embodiments, the ACK criterion is $Z_{ack} > Z_{Nack} + \delta_1$ and the NACK criterion is $Z_{Nack} > Z_{ack} + \delta_2$, where $\delta_1$ is the ACK bias value, $\delta_2$ is the NACK bias value, $Z_{ack}$ is a detected sequence correlated with a HARQ-ACK sequence with the received sequence after equalization, and $Z_{Nack}$ is a detected sequence correlated with a HARQ-NACK sequence with the received sequence after equalization. In some embodiments, detection thresholds are applied for detecting PUCCH format 0 of 5G wireless systems. In some embodiments, detection thresholds are applied for detecting PUCCH format 1 of 5G wireless systems.

According to another aspect, a method implemented in a network node includes determining if a detected sequence meets one of an acknowledgement (ACK) criterion and negative-acknowledgement (NACK) criterion using at least one bias value, the at least one bias value being based at last in part on a type of service associated with the detected sequence.

According to this aspect, in some embodiments, the at least one bias value includes an ACK bias value and a NACK bias value, where the ACK bias value is greater than the NACK bias value. In some embodiments, the at least one bias value includes a first ACK bias value for a first service, a first NACK bias value for the first service, a second ACK bias value for a second service and a second NACK bias value for the second service; the first ACK bias value being greater than the second ACK bias value; and the second ACK bias value being greater than the second NACK bias value. In some embodiments, the at least one bias value includes a first ACK bias value for a first service, a first NACK bias value for the first service, a second ACK bias value for a second service and a second NACK bias value for the second service; the first ACK bias value being greater than the first NACK bias value; and the first NACK bias value being greater than the second NACK bias value. In some embodiments, the first service is URLLC and the second service is eMBB. In some embodiments, the ACK criterion is $Z_{ack} > Z_{Nack} + \delta_1$ and the NACK criterion is $Z_{Nack} > Z_{ack} + \delta_2$, where $\delta_1$ is the ACK bias value, $\delta_2$ is the NACK bias value, $Z_{ack}$ is a detected sequence correlated with a HARQ-ACK sequence and the received sequence, and $Z_{Nack}$ is a detected sequence correlated with a HARQ-NACK sequence and the received sequence. In some embodiments, the ACK criterion is $Z_{ack} > Z_{Nack} + \delta_1$ and the NACK criterion is $Z_{Nack} > Z_{ack} + \delta_2$, where $\delta_1$ is the ACK bias value, $\delta_2$ is the NACK bias value, $Z_{ack}$ is a detected sequence correlated with a HARQ-ACK sequence with the received sequence after equalization, and $Z_{Nack}$ is a detected sequence correlated with a HARQ-NACK sequence with the received sequence after equalization. In some embodiments, detection thresholds are applied for detecting PUCCH format 0 of 5G wireless systems. In some embodiments, detection thresholds are applied for detecting PUCCH format 1 of 5G wireless systems.

According to yet another aspect, a WD configured to communicate with a network node, includes processing circuitry configured to determine if a detected sequence received from the network node meets one of an acknowledgement (ACK) criterion and negative-acknowledgement (NACK) criterion using at least one bias value, the at least one bias value being based at last in part on a type of service associated with the detected sequence.

According to this aspect, in some embodiments, the at least one bias value includes an ACK bias value and a NACK bias value, where the ACK bias value is greater than the NACK bias value. In some embodiments, the at least one bias value includes a first ACK bias value for a first service, a first NACK bias value for the first service, a second ACK bias value for a second service and a second NACK bias value for the second service; the first ACK bias value being greater than the second ACK bias value; and the second ACK bias value being greater than the second NACK bias value. In some embodiments, the at least one bias value includes a first ACK bias value for a first service, a first NACK bias value for the first service, a second ACK bias value for a second service and a second NACK bias value for the second service; the first ACK bias value being greater than the first NACK bias value; and the first NACK bias value being greater than the second NACK bias value. In some embodiments, the first service is URLLC and the second service is eMBB. In some embodiments, the ACK criterion is $Z_{ack} > Z_{Nack} + \delta_1$ and the NACK criterion is $Z_{Nack} > Z_{ack} + \delta_2$, where $\delta_1$ is the ACK bias value, $\delta_2$ is the NACK bias value, $Z_{ack}$ is a detected sequence correlated with a HARQ-ACK sequence and the received sequence, and $Z_{Nack}$ is a detected sequence correlated with a HARQ-NACK sequence and the received sequence. In some embodiments, the ACK criterion is $Z_{ack} > Z_{Nack} + \delta_1$ and the NACK criterion is $Z_{Nack} > Z_{ack} + \delta_2$, where $\delta_1$ is the ACK bias value, $\delta_2$ is the NACK bias value, $Z_{ack}$ is a detected sequence correlated with a HARQ-ACK sequence with the received sequence after equalization, and $Z_{Nack}$ is a detected sequence correlated with a HARQ-NACK sequence with the received sequence after equalization.

According to another aspect, a method implemented in a WD includes determining if a detected sequence received from a network node meets one of an acknowledgement (ACK) criterion and negative-acknowledgement (NACK) criterion using at least one bias value, the at least one bias value being based at last in part on a type of service associated with the detected sequence.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 6 is a flowchart illustrating exemplary methods implemented in a communication system including a host computer, a network node and a wireless device for receiving user data from the wireless device at a host computer according to some embodiments of the present disclosure;

FIG. 7 is a flowchart illustrating exemplary methods implemented in a communication system including a host computer, a network node and a wireless device for receiving user data at a host computer according to some embodiments of the present disclosure;

DETAILED DESCRIPTION

Figure 1:
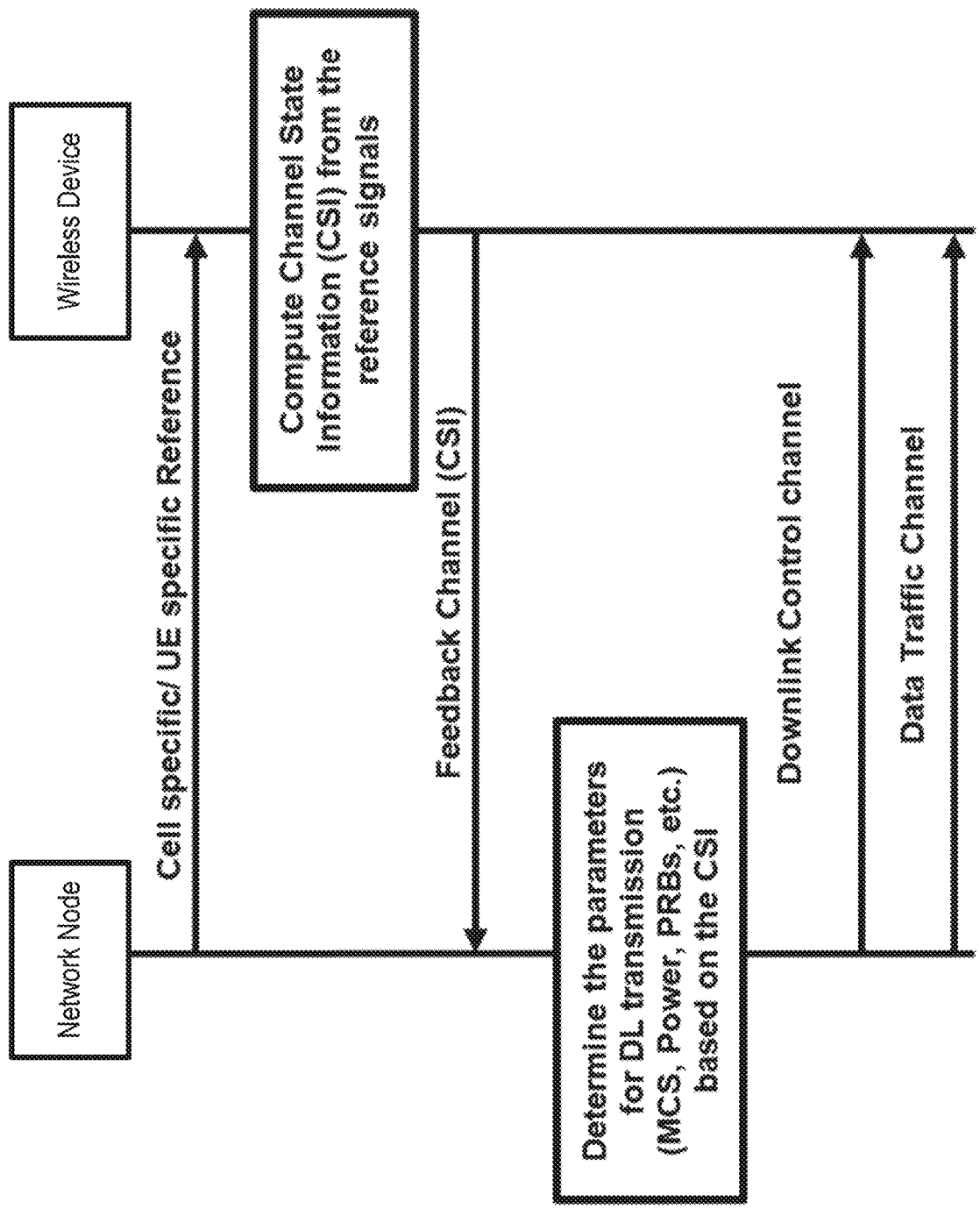
FIG. 1 is a signaling diagram of a message sequence chart between the network node and wireless device.

Before describing in detail exemplary embodiments, it is noted that the embodiments reside primarily in combinations of apparatus components and processing steps related to HARQ detection and/or processing using at least one bias value based at least in part on at least one type of service. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information.

Transmitting in downlink may pertain to transmission from the network or network node to the terminal. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Configuring a terminal or wireless device or node may involve instructing and/or causing the wireless device or node to change its configuration, e.g., at least one setting and/or register entry and/or operational mode. A terminal or wireless device or node may be adapted to configure itself, e.g., according to information or data in a memory of the terminal or wireless device. Configuring a node or terminal or wireless device by another device or node or a network may refer to and/or comprise transmitting information and/ or data and/or instructions to the wireless device or node by the other device or node or the network, e.g., allocation data (which may also be and/or comprise configuration data) and/or scheduling data and/or scheduling grants. Configuring a terminal may include sending allocation/configuration data to the terminal indicating which modulation and/or encoding to use. A terminal may be configured with and/or for scheduling data and/or to use, e.g., for transmission, scheduled and/or allocated uplink resources, and/or, e.g., for reception, scheduled and/or allocated downlink resources. Uplink resources and/or downlink resources may be scheduled and/or provided with allocation or configuration data.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

One or more embodiments described herein are applicable to single carrier as well as to multicarrier (MC) or carrier aggregation (CA) operation of the wireless device. The term carrier aggregation (CA) is also called (e.g. interchangeably called) "multi-carrier system", "multi-cell operation", "multi-carrier operation", "multi-carrier" transmission and/or reception.

One or more embodiments described herein are also applicable for transmission from multiple transmission reception points also called multiple TRPs.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide HARQ detection and/or processing using at least one bias value based at least in part on at least one type of service.

Figure 2:
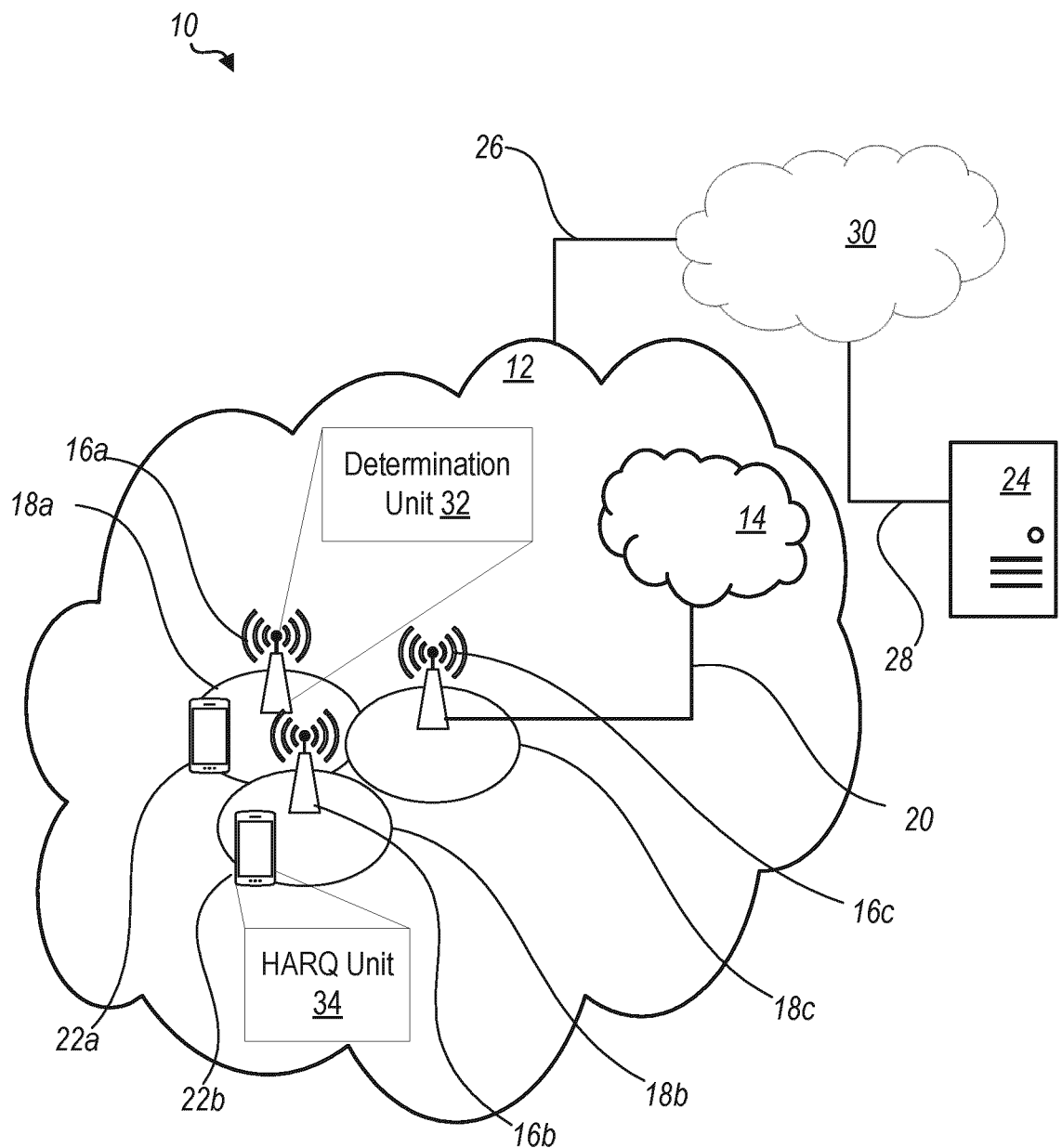
FIG. 2 is a schematic diagram of an exemplary network architecture illustrating a communication system connected via an intermediate network to a host computer according to the principles in the present disclosure.

Referring again to the drawing figures, in which like elements are referred to by like reference numerals, there is shown in FIG. 2 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 2 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over) to a connected WD 22a. Similarly, the network node 16 need not be aware of the future routing of an outgoing uplink communication originating from the WD 22a towards the host computer 24.

A network node 16 is configured to include a determination unit 32 which is configured to provide one or more network node 16 functions as described herein such as with respect to HARQ detection and/or processing using at least one bias value based at least in part on at least one type of service. A wireless device 22 is configured to include a HARQ unit 34 which is configured to provide one or more wireless device 22 functions described herein such as with respect to HARQ detection and/or processing using at least one bias value based at least in part on at least one type of service.

Example implementations, in accordance with an embodiment, of the WD 22, network node 16 and host computer 24 discussed in the preceding paragraphs will now be described with reference to FIG. 3. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22. The processing circuitry 42 of the host computer 24 may include an information unit 54 configured to enable the service provider to provide, process, receive, transmit, relay, forward, store, determine, etc. information related to HARQ detection and/or processing using at least one bias value based at least in part on at least one type of service.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include determination unit 32 configured to perform one or more network node 16 functions as described herein such as with respect to HARQ detection and/or processing using at least one bias value based at least in part on at least one type of service.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a HARQ unit 34 configured to perform one or more wireless device 22 functions as described herein such as with respect to HARQ detection and/or processing using at least one bias value based at least in part on at least one type of service.

Figure 3:
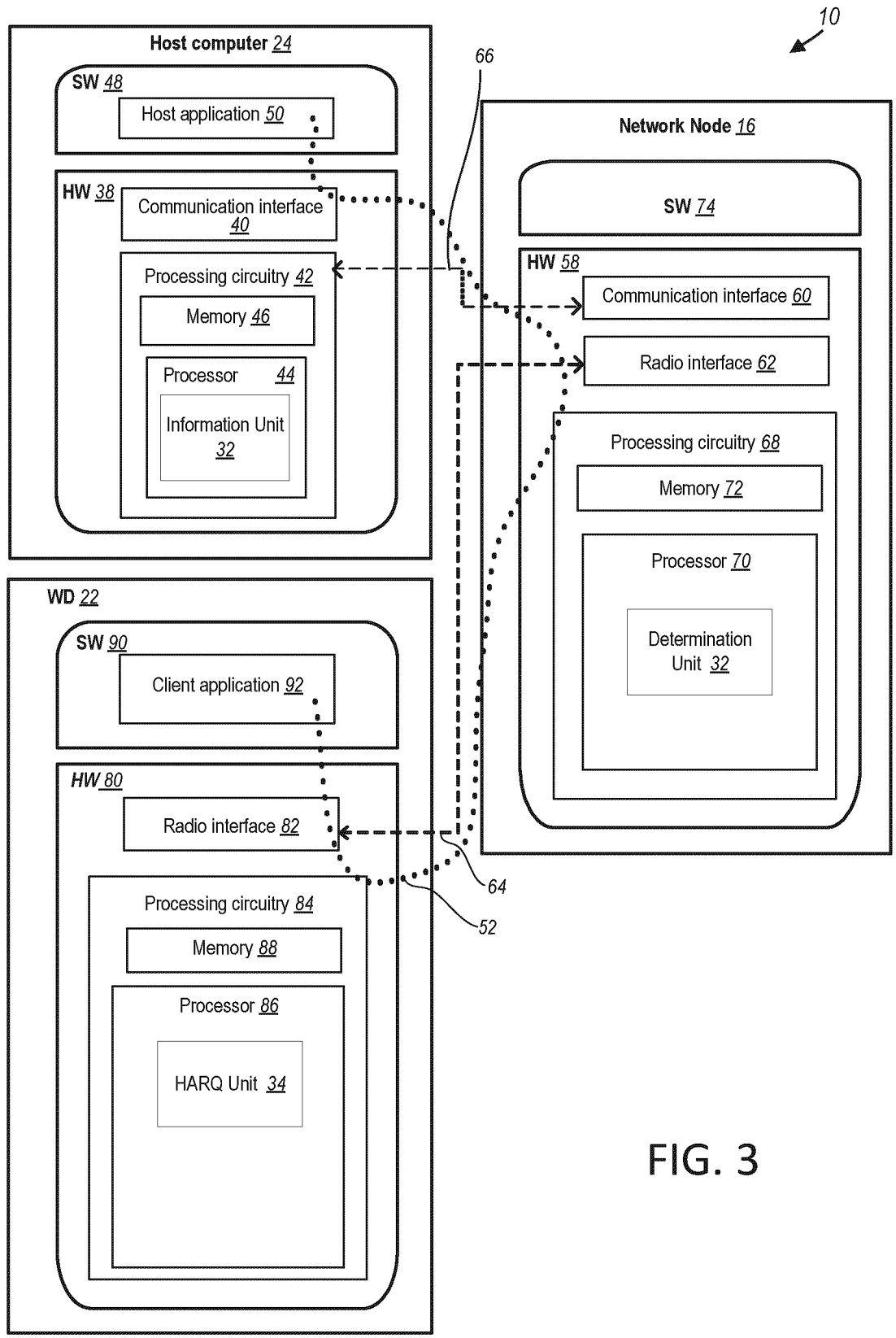
FIG. 3 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 3 and independently, the surrounding network topology may be that of FIG. 2.

In FIG. 3, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 2 and 3 show various "units" such as determination unit 32, and HARQ unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figures 4, 5:
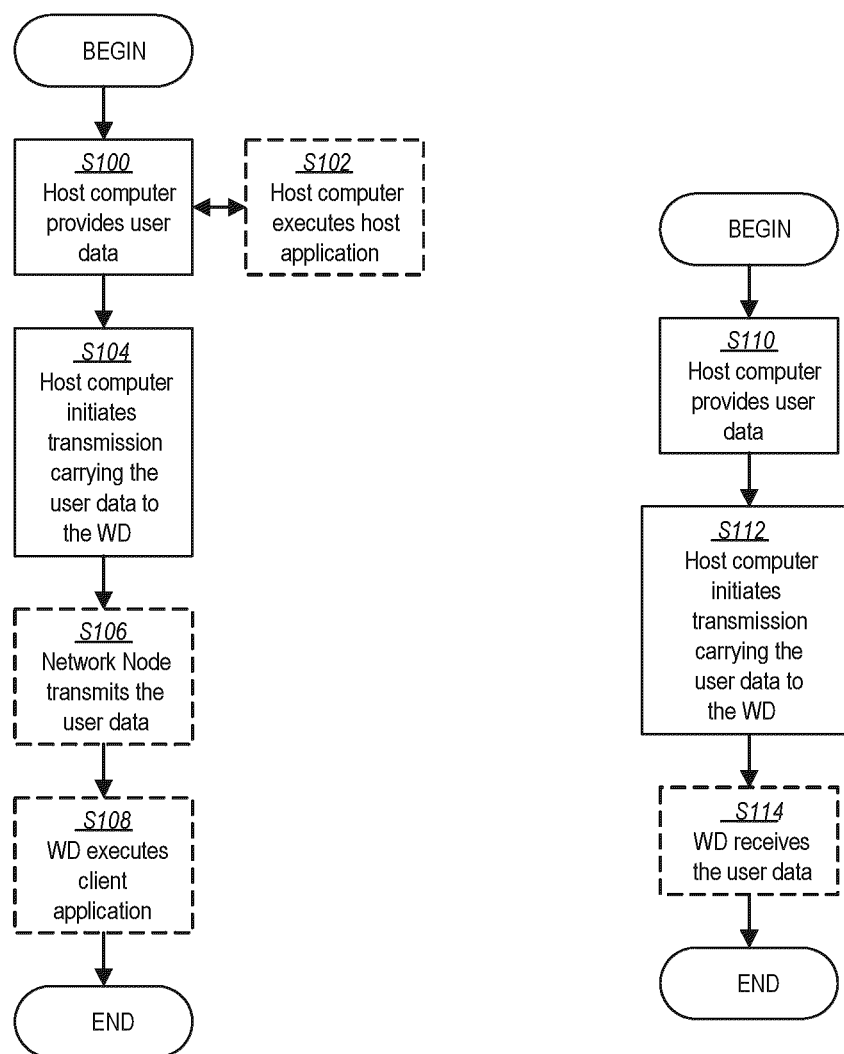
FIG. 4 is a flowchart illustrating exemplary methods implemented in a communication system including a host computer, a network node and a wireless device for executing a client application at a wireless device according to some embodiments of the present disclosure.
FIG. 5 is a flowchart illustrating exemplary methods implemented in a communication system including a host computer, a network node and a wireless device for receiving user data at a wireless device according to some embodiments of the present disclosure.

FIG. 4 is a flowchart illustrating an exemplary method implemented in a communication system, such as, for example, the communication system of FIGS. 2 and 3, in accordance with one embodiment. The communication system may include a host computer 24, a network node 16 and a WD 22, which may be those described with reference to FIG. 3. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 5 is a flowchart illustrating an exemplary method implemented in a communication system, such as, for example, the communication system of FIG. 2, in accordance with one embodiment. The communication system may include a host computer 24, a network node 16 and a WD 22, which may be those described with reference to FIGS. 2 and 3. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

FIG. 6 is a flowchart illustrating an exemplary method implemented in a communication system, such as, for example, the communication system of FIG. 2, in accordance with one embodiment. The communication system may include a host computer 24, a network node 16 and a WD 22, which may be those described with reference to FIGS. 2 and 3. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 7 is a flowchart illustrating an exemplary method implemented in a communication system, such as, for example, the communication system of FIG. 2, in accordance with one embodiment. The communication system may include a host computer 24, a network node 16 and a WD 22, which may be those described with reference to FIGS. 2 and 3. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 8:
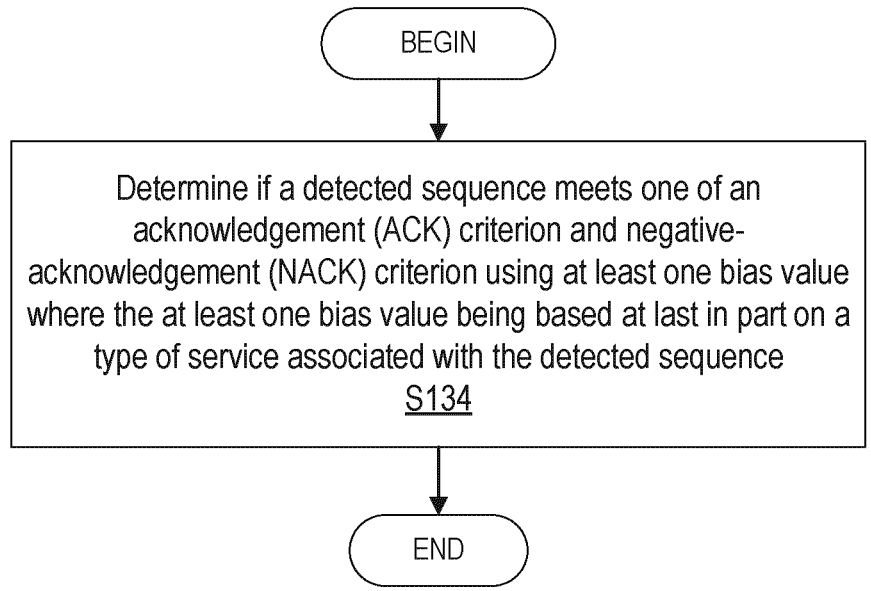
FIG. 8 is a flowchart of an exemplary process in a network node according to some embodiments of the present disclosure.

FIG. 8 is a flowchart of an exemplary process in a network node 16 according to some embodiments of the disclosure. One or more Blocks and/or functions performed by network node 16 may be performed by one or more elements of network node 16 such as by determination unit 32 in processing circuitry 68, processor 70, radio interface 62, etc. In one or more embodiments, network node 16 such as via one or more of processing circuitry 68, processor 70, communication interface 60 and radio interface 62 is configured to determine (Block S134) if a detected sequence meets one of an acknowledgement (ACK) criterion and negative-acknowledgement (NACK) criterion using at least one bias value where the at least one bias value being based at last in part on a type of service associated with the detected sequence, as described herein.

According to one or more embodiments, the at least one bias value includes an ACK bias value and a NACK bias value where the ACK bias value is greater than the NACK bias value. According to one or more embodiments, the at least one bias value includes a first ACK bias value for a first service, a first NACK bias value for the first service, a second ACK bias value for a second service and a second NACK bias value for the second service. The first ACK bias value is greater than the second ACK bias value. The second ACK bias value is greater than the second NACK bias value. According to one or more embodiments, the ACK criterion is $Z_{ack} > Z_{Nack} + \delta_1$ and the NACK criterion is $Z_{Nack} > Z_{ack} + \delta_2$, where $\delta_1$ is the ACK bias value, $\delta_2$ is the NACK bias value, $Z_{ack}$ is a detected sequence correlated with a HARQ-ACK sequence, and $Z_{Nack}$ is a detected sequence correlated with a HARQ-NACK sequence.

Figure 9:
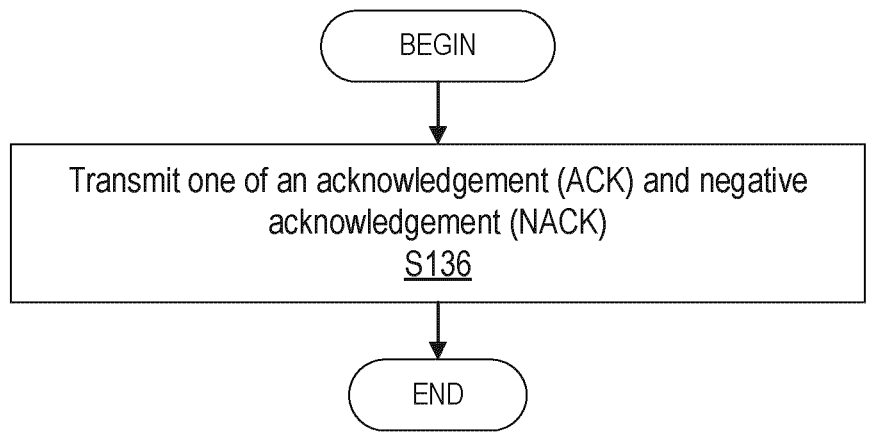
FIG. 9 is a flowchart of an exemplary process in a wireless device according to some embodiments of the present disclosure.

FIG. 9 is a flowchart of an exemplary process in a wireless device 22 according to some embodiments of the present disclosure. One or more Blocks and/or functions performed by wireless device 22 may be performed by one or more elements of wireless device 22 such as by HARQ unit 34 in processing circuitry 84, processor 86, radio interface 82, etc. In one or more embodiments, wireless device such as via one or more of processing circuitry 84, processor 86 and radio interface 82 is configured to transmit (Block S136) one of an acknowledgement (ACK) and negative acknowledgement (NACK), as described herein.

Figure 10:
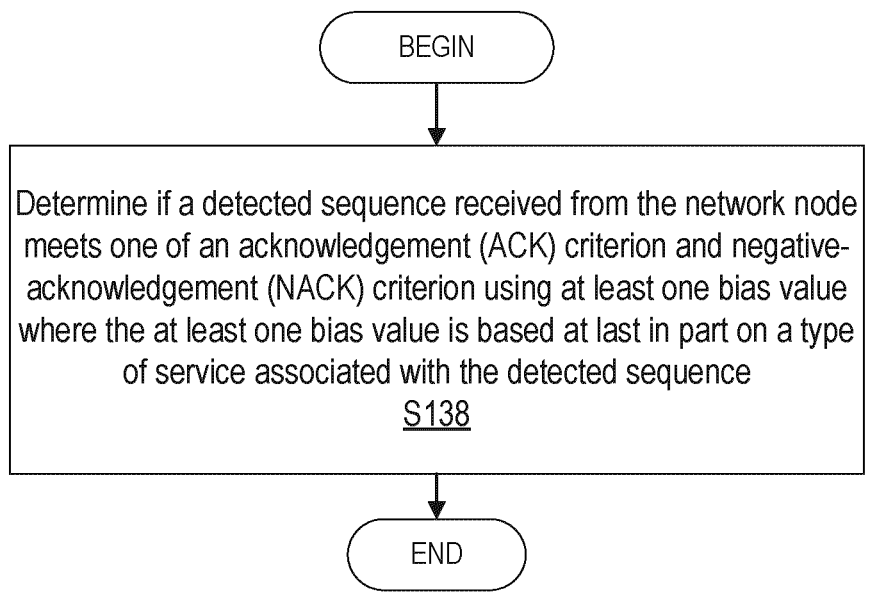
FIG. 10 is a flowchart of another exemplary process in a wireless device according to some embodiments of the present disclosure.

FIG. 10 is a flowchart of another exemplary process in a wireless device 22 according to some embodiments of the present disclosure. For example, in one or more embodiments wireless device 22 may receive HARQ feedback from a network node 16 and/or another wireless device 22 such that the wireless device 22 may implement the HARQ detection methods described herein. One or more Blocks and/or functions performed by wireless device 22 may be performed by one or more elements of wireless device 22 such as by HARQ unit 34 in processing circuitry 84, processor 86, radio interface 82, etc. In one or more embodiments, wireless device such as via one or more of processing circuitry 84, processor 86 and radio interface 82 is configured to determine (Block S138) if a detected sequence received from the network node meets one of an acknowledgement (ACK) criterion and negative-acknowledgement (NACK) criterion using at least one bias value where the at least one bias value is based at last in part on a type of service associated with the detected sequence.

Having generally described arrangements for HARQ detection and/or processing using at least one bias value based at least in part on at least one type of service, details for these arrangements, functions and processes are provided as follows, and which may be implemented by the network node 16, wireless device 22 and/or host computer 24.

Embodiments provide HARQ detection and/or processing using at least one bias value based at least in part on at least one type of service.

Biased Detector for PUCCH Format 0

In one or more embodiments of the biased detection scheme the network node 16 such as via one or more of processing circuitry 68, processor 70, radio interface 62, determination unit 32, etc., uses different thresholds for determining the HARQ-ACK or HARQ-NACK. The received signal at the network node 16 can be written as $$Y = Hx + n$$

where Y is the received signal such as via one or more of processing circuitry 68, processor 70, radio interface 62, determination unit 32, etc., H is the channel matrix, x is the transmitted HARQ-ACK/HARQ-NACK, and n is the noise plus interference. With a correlation-based detector (for example using PUCCH format 0), the network node 16 such as via one or more of processing circuitry 68, processor 70, radio interface 62, determination unit 32, etc., uses the following criteria to determine the HARQ-ACK or HARQ-NACK. Let $$Z_{ack} = x_{ack}^h Y$$

where $x_{ack}^h$ is the complex conjugate of HARQ-ACK sequence, $Z_{ack}$ is the detected sequence after correlating with HARQ-ACK sequence. Similarly, $$Z_{Nack} = x_{Nack}^h Y$$

where $x_{Nack}^h$ is the complex conjugate of HARQ-NACK sequence, $Z_{Nack}$ is the detected sequence after correlating with HARQ-NACK sequence.

Then according to the teachings described herein, for a first service such as URLLC, the network node 16 such as, for example, via one or more of processing circuitry 68, processor 70, radio interface 62, determination unit 32, etc., determines the final outcome of the detected sequence to be a HARQ-ACK only when the following criterion (i.e., ACK criterion) is met:

$$Z_{ack} > Z_{Nack} + \delta_1^{URLLC}$$

where $\delta_1^{URLLC}$ is the bias (i.e., bias value or threshold value) used to detect HARQ-ACK.

Similarly, for a first service such as URLLC, the network node 16 such as for example via one or more of processing circuitry 68, processor 70, radio interface 62, determination unit 32, etc., determines the final outcome of the detected sequence to be a HARQ-NACK only when the following criterion (i.e., NACK criterion) is met:

$$Z_{Nack} > Z_{ack} + \delta_2^{URLLC}$$

Since the consequence of HARQ-ACK mis detection is severe if the network node 16 such as for example via one or more of processing circuitry 68, processor 70, radio interface 62, determination unit 32, etc., detects a HARQ-ACK even though the wireless device 22 for example such as via one or more of processing circuitry 84, processor 86, radio interface 82, HARQ unit 34, etc. sends HARQ-NACK, in one or more embodiments, a higher threshold (i.e., high bias value or threshold value) for $\delta_1^{URLLC}$ may be used and/or implemented when compared to a threshold for $\delta_2^{URLLC}$. That is $$\delta_1^{URLLC} > \delta_2^{URLLC}$$

However, when the network node 16 such as for example via one or more of processing circuitry 68, processor 70, radio interface 62, determination unit 32, etc., uses eMBB services (i.e., a second service different from the first service such as URLLC that is more strict in terms of at least one service requirement), the same procedure is applied, however, in this case the consequences are less severe for probability of mis-detection.

Therefore, the following thresholds (i.e., bias values) may be implemented and/or configured:

$$\delta_1^{eMBB} > \delta_2^{eMBB}$$

and $$\delta_1^{URLLC} > \delta_1^{eMBB}$$

That is, in one or more embodiments, the network node 16 such as for example via one or more of processing circuitry 68, processor 70, radio interface 62, determination unit 32, etc., uses 4 different thresholds (i.e., threshold values or bias values) to detect whether the wireless device 22 sends HARQ-ACK or not. In one or more other embodiments, the network node 16 such as for example via one or more of processing circuitry 68, processor 70, radio interface 62, determination unit 32, etc., uses 2 thresholds where the one or more thresholds are different based on the type of service. That is, the following thresholds (i.e., bias values) may be set and/or configured by the network node 16:

$$\delta_1^{URLLC} = \delta_2^{URLLC} \text{ and } \delta_1^{eMBB} = \delta_2^{eMBB}$$

However $$\delta_1^{URLLC} > \delta_1^{eMBB}$$

Biased Detector for PUCCH Format 1

In one or more embodiments, a biased detection scheme is provided where the network node 16 such as for example via one or more of processing circuitry 68, processor 70, radio interface 62, determination unit 32, etc., uses different thresholds for determining the HARQ-ACK or HARQ-NACK. The received signal in the network node 16 can be written as $$Y = Hx + n$$

where Y is the received signal, H is the channel matrix, x is the transmitted HARQ-ACK/HARQ-NACK, and n is the noise plus interference. With a MMSE/MRC based detector (for example using or based on PUCCH format 1), the network node 16 such as for example via one or more of processing circuitry 68, processor 70, radio interface 62, determination unit 32, etc., uses the following criteria to determine the HARQ-ACK or HARQ-NACK. Let $Y_{Linear}$ be the output of the MMSE/MRC detector (after channel estimation and detection), then $$Z_{ack} = x_{ack}{}^h Y_{Linear}$$

where $x_{ack}{}^h$ is the complex conjugate of HARQ-ACK sequence, $Z_{ack}$ is the detected sequence after correlating with HARQ-ACK sequence.

Similarly, $$Z_{Nack} = x_{Nack}{}^h Y_{Linear}$$

where $x_{Nack}{}^h$ is the complex conjugate of HARQ-NACK sequence, $Z_{Nack}$ is the detected sequence after correlating with HARQ-NACK sequence.

Then according to the teaching of the disclosure, for a first service such as URLLC, the network node 16 such as for example via one or more of processing circuitry 68, processor 70, radio interface 62, determination unit 32, etc., determines the final outcome of the detected sequence to be HARQ-ACK only when the following criterion (ACK criterion) is met:

$$Z_{ack} > Z_{Nack} + \delta_1^{URLLC}$$

where $\delta_1^{URLLC}$ is the bias (i.e., threshold value) used to detect HARQ-ACK.

Similarly, the network node 16 such as for example via one or more of processing circuitry 68, processor 70, radio interface 62, determination unit 32, etc., determines the final outcome of the detected sequence to be HARQ-NACK only when the following criterion (i.e., NACK criterion) is met:

$$Z_{Nack} > Z_{ack} + \delta_2^{URLLC}$$

Since the consequence of HARQ-ACK mis detection is severe if the network node 16 such as for example via one or more of processing circuitry 68, processor 70, radio interface 62, determination unit 32, etc., detects a HARQ-ACK even though the wireless device 22 such as for example via one or more of processing circuitry 84, processor 86, radio interface 82, HARQ unit 34, etc. sends HARQ-NACK, in one or more embodiments, it is proposed to use a higher threshold (i.e., threshold value or bias value) for $\delta_1^{URLLC}$ than is used for $\delta_2^{URLLC}$. That is $$\delta_1^{URLLC} > \delta_2^{URLLC}$$

However, when the network node 16 such as for example via one or more of processing circuitry 68, processor 70, radio interface 62, determination unit 32, etc., uses eMBB services (i.e., uses a second service with at least one less strict requirement than a first service), the same procedure is applied, however, in this case the consequences are less severe for probability of mis-detection, thus the following thresholds (i.e., threshold values or bias values) may be configured and/or set by network node 16:

$$\delta_1^{eMBB} > \delta_2^{eMBB}$$

and $$\delta_1^{URLLC} > \delta_1^{eMBB}$$

That is, network node 16 such as for example via one or more of processing circuitry 68, processor 70, radio interface 62, determination unit 32, etc., uses 4 different thresholds values (i.e., various $\delta$ or bias values) to detect whether the wireless device 22 sends HARQ-ACK or not.

In another embodiment, the network node 16 such as for example via one or more of processing circuitry 84, processor 86, radio interface 82, HARQ unit 34, etc. uses 2 thresholds where the threshold is different based on the type of service. That is $$\delta_1^{URLLC} = \delta_2^{URLLC} \text{ and } \delta_1^{eMBB} = \delta_2^{eMBB}$$

However $$\delta_1^{URLLC} > \delta_1^{eMBB}$$

Therefore, one or more embodiments provide for detection of the uplink control channel which serves and/or provides at least two services such as for eMBB and URLLC services. In one or more embodiments, the network node 16 may use a biased detector where the bias depends on the type of service used and uses one bias for HARQ-ACK and another bias for HARQ-NACK detection. This improves the resource utilization at the same time satisfies the URLLC and eMBB requirements. In one or more embodiments, use of the detected described herein may be detected by looking at logs of the uplink control channel.

According to one aspect, a network node 16 is configured to communicate with a wireless device (WD 22). The network node 16 includes processing circuitry 68 configured to determine if a detected sequence meets one of an acknowledgement (ACK) criterion and negative-acknowledgement (NACK) criterion using at least one bias value, the at least one bias value being based at last in part on a type of service associated with the detected sequence.

According to this aspect, in some embodiments, the at least one bias value includes an ACK bias value and a NACK bias value, where the ACK bias value is greater than the NACK bias value. In some embodiments, the at least one bias value includes a first ACK bias value for a first service, a first NACK bias value for the first service, a second ACK bias value for a second service and a second NACK bias value for the second service, the first ACK bias value being greater than the second ACK bias value, and the second ACK bias value being greater than the second NACK bias value. In some embodiments, the at least one bias value includes a first ACK bias value for a first service, a first NACK bias value for the first service, a second ACK bias value for a second service and a second NACK bias value for the second service, the first ACK bias value being greater than the first NACK bias value, and the first NACK bias value being greater than the second NACK bias value. In some embodiments, the first service is URLLC and the second service is eMBB. In some embodiments, the ACK criterion is $Z_{ack} > Z_{Nack} + \delta_1$ and the NACK criterion is $Z_{Nack} > Z_{ack} + \delta_2$, where $\delta_1$ is the ACK bias value, $\delta_2$ is the NACK bias value, $Z_{ack}$ is a detected sequence correlated with a HARQ-ACK sequence and the received sequence, and $Z_{Nack}$ is a detected sequence correlated with a HARQ-NACK sequence and the received sequence. In some embodiments, the ACK criterion is $Z_{ack} > Z_{Nack} + \delta_1$ and the NACK criterion is $Z_{Nack} > Z_{ack} + \delta_2$, where $\delta_1$ is the ACK bias value, $\delta_2$ is the NACK bias value, $Z_{ack}$ is a detected sequence correlated with a HARQ-ACK sequence with the received sequence after equalization, and $Z_{Nack}$ is a detected sequence correlated with a HARQ-NACK sequence with the received sequence after equalization. In some embodiments, detection thresholds are applied for detecting PUCCH format 0 of 5G wireless systems. In some embodiments, detection thresholds are applied for detecting PUCCH format 1 of 5G wireless systems.

According to another aspect, a method implemented in a network node 16 includes determining, via processing circuitry 68, if a detected sequence meets one of an acknowledgement (ACK) criterion and negative-acknowledgement (NACK) criterion using at least one bias value, the at least one bias value being based at last in part on a type of service associated with the detected sequence.

According to this aspect, in some embodiments, the at least one bias value includes an ACK bias value and a NACK bias value, where the ACK bias value is greater than the NACK bias value. In some embodiments, the at least one bias value includes a first ACK bias value for a first service, a first NACK bias value for the first service, a second ACK bias value for a second service and a second NACK bias value for the second service; the first ACK bias value being greater than the second ACK bias value; and the second ACK bias value being greater than the second NACK bias value. In some embodiments, the at least one bias value includes a first ACK bias value for a first service, a first NACK bias value for the first service, a second ACK bias value for a second service and a second NACK bias value for the second service; the first ACK bias value being greater than the first NACK bias value; and the first NACK bias value being greater than the second NACK bias value. In some embodiments, the first service is URLLC and the second service is eMBB. In some embodiments, the ACK criterion is $Z_{ack} > Z_{Nack} + \delta_1$ and the NACK criterion is $Z_{Nack} > Z_{ack} + \delta_2$, where $\delta_1$ is the ACK bias value, $\delta_2$ is the NACK bias value, $Z_{ack}$ is a detected sequence correlated with a HARQ-ACK sequence and the received sequence, and $Z_{Nack}$ is a detected sequence correlated with a HARQ-NACK sequence and the received sequence. In some embodiments, the ACK criterion is $Z_{ack} > Z_{Nack} + \delta_1$ and the NACK criterion is $Z_{Nack} > Z_{ack} + \delta_2$, where $\delta_1$ is the ACK bias value, $\delta_2$ is the NACK bias value, $Z_{ack}$ is a detected sequence correlated with a HARQ-ACK sequence with the received sequence after equalization, and $Z_{Nack}$ is a detected sequence correlated with a HARQ-NACK sequence with the received sequence after equalization. In some embodiments, detection thresholds are applied for detecting PUCCH format 0 of 5G wireless systems. In some embodiments, detection thresholds are applied for detecting PUCCH format 1 of 5G wireless systems.

According to yet another aspect, a WD 22 configured to communicate with a network node 16, includes processing circuitry 84 configured to determine if a detected sequence received from the network node 16 meets one of an acknowledgement (ACK) criterion and negative-acknowledgement (NACK) criterion using at least one bias value, the at least one bias value being based at last in part on a type of service associated with the detected sequence.

According to this aspect, in some embodiments, the at least one bias value includes an ACK bias value and a NACK bias value, where the ACK bias value is greater than the NACK bias value. In some embodiments, the at least one bias value includes a first ACK bias value for a first service, a first NACK bias value for the first service, a second ACK bias value for a second service and a second NACK bias value for the second service; the first ACK bias value being greater than the second ACK bias value; and the second ACK bias value being greater than the second NACK bias value. In some embodiments, the at least one bias value includes a first ACK bias value for a first service, a first NACK bias value for the first service, a second ACK bias value for a second service and a second NACK bias value for the second service; the first ACK bias value being greater than the first NACK bias value; and the first NACK bias value being greater than the second NACK bias value. In some embodiments, the first service is URLLC and the second service is eMBB. In some embodiments, the ACK criterion is $Z_{ack} > Z_{Nack} + \delta_1$ and the NACK criterion is $Z_{Nack} > Z_{ack} + \delta_2$, where $\delta_1$ is the ACK bias value, $\delta_2$ is the NACK bias value, $Z_{ack}$ is a detected sequence correlated with a HARQ-ACK sequence and the received sequence, and $Z_{Nack}$ is a detected sequence correlated with a HARQ-NACK sequence and the received sequence. In some embodiments, the ACK criterion is $Z_{ack} > Z_{Nack} + \delta_1$ and the NACK criterion is $Z_{Nack} > Z_{ack} + \delta_2$, where $\delta_1$ is the ACK bias value, $\delta_2$ is the NACK bias value, $Z_{ack}$ is a detected sequence correlated with a HARQ-ACK sequence with the received sequence after equalization, and $Z_{Nack}$ is a detected sequence correlated with a HARQ-NACK sequence with the received sequence after equalization.

According to another aspect, a method implemented in a WD 22 includes determining, via processing circuitry 84, if a detected sequence received from a network node 16 meets one of an acknowledgement (ACK) criterion and negative-acknowledgement (NACK) criterion using at least one bias value, the at least one bias value being based at last in part on a type of service associated with the detected sequence.

According to this aspect, in some embodiments, the at least one bias value includes an ACK bias value and a NACK bias value, where the ACK bias value is greater than the NACK bias value. In some embodiments, the at least one bias value includes a first ACK bias value for a first service, a first NACK bias value for the first service, a second ACK bias value for a second service and a second NACK bias value for the second service; the first ACK bias value being greater than the second ACK bias value; and the second ACK bias value being greater than the second NACK bias value. In some embodiments, the at least one bias value includes a first ACK bias value for a first service, a first NACK bias value for the first service, a second ACK bias value for a second service and a second NACK bias value for the second service; the first ACK bias value being greater than the first NACK bias value; and the first NACK bias value being greater than the second NACK bias value. In some embodiments, the first service is URLLC and the second service is eMBB. In some embodiments, the ACK criterion is $Z_{ack} > Z_{Nack} + \delta_1$ and the NACK criterion is $Z_{Nack} > Z_{ack} + \delta_2$, where $\delta_1$ is the ACK bias value, $\delta_2$ is the NACK bias value, $Z_{ack}$ is a detected sequence correlated with a HARQ-ACK sequence and the received sequence, and $Z_{Nack}$ is a detected sequence correlated with a HARQ-NACK sequence and the received sequence. In some embodiments, the ACK criterion is $Z_{ack} > Z_{Nack} + \delta_1$ and the NACK criterion is $Z_{Nack} > Z_{ack} + \delta_2$, where $\delta_1$ is the ACK bias value, $\delta_2$ is the NACK bias value, $Z_{ack}$ is a detected sequence correlated with a HARQ-ACK sequence with the received sequence after equalization, and $Z_{Nack}$ is a detected sequence correlated with a HARQ-NACK sequence with the received sequence after equalization.

Some embodiments include:

Embodiment A1. A network node configured to communicate with a wireless device (WD), the network node configured to, and/or comprising a radio interface and/or comprising processing circuitry configured to:

determine if a detected sequence meets one of an acknowledgement (ACK) criterion and negative-acknowledgement (NACK) criterion using at least one bias value, the at least one bias value being based at last in part on a type of service associated with the detected sequence.

Embodiment A2. The network node of Embodiment A1, wherein the at least one bias value includes an ACK bias value and a NACK bias value, where the ACK bias value is greater than the NACK bias value.

Embodiment A3. The network node of Embodiment A1, wherein the at least one bias value includes a first ACK bias value for a first service, a first NACK bias value for the first service, a second ACK bias value for a second service and a second NACK bias value for the second service;

the first ACK bias value being greater than the second ACK bias value; and the second ACK bias value being greater than the second NACK bias value.

Embodiment A4. The network node of Embodiment A1, wherein the ACK criterion is $Z_{ack} > Z_{Nack} + \delta_1$ and the NACK criterion is $Z_{Nack} > Z_{ack} + \delta_2$, where $\delta_1$ is the ACK bias value, $\delta_2$ is the NACK bias value, $Z_{ack}$ is a detected sequence correlated with a HARQ-ACK sequence, and $Z_{Nack}$ is a detected sequence correlated with a HARQ-NACK sequence.

Embodiment B1. A method implemented in a network node, the method comprising determining if a detected sequence meets one of an acknowledgement (ACK) criterion and negative-acknowledgement (NACK) criterion using at least one bias value, the at least one bias value being based at last in part on a type of service associated with the detected sequence.

Embodiment B2. The method of Embodiment B1, wherein the at least one bias value includes an ACK bias value and a NACK bias value, where the ACK bias value is greater than the NACK bias value.

Embodiment B3. The method of Embodiment B1, wherein the at least one bias value includes a first ACK bias value for a first service, a first NACK bias value for the first service, a second ACK bias value for a second service and a second NACK bias value for the second service;

the first ACK bias value being greater than the second ACK bias value; and the second ACK bias value being greater than the second NACK bias value.

Embodiment B4. The method of Embodiment B1, wherein the ACK criterion is $Z_{ack} > Z_{Nack} + \delta_1$ and the NACK criterion is $Z_{Nack} > Z_{ack} + \delta_2$, where $\delta_1$ is the ACK bias value, $\delta_2$ is the NACK bias value, $Z_{ack}$ is a detected sequence correlated with a HARQ-ACK sequence, and $Z_{Nack}$ is a detected sequence correlated with a HARQ-NACK sequence.

Embodiment C1. A wireless device (WD) configured to communicate with a network node, the WD configured to, and/or comprising a radio interface and/or processing circuitry configured to determine if a detected sequence received from the network node meets one of an acknowledgement (ACK) criterion and negative-acknowledgement (NACK) criterion using at least one bias value, the at least one bias value being based at last in part on a type of service associated with the detected sequence.

Embodiment D1. A method implemented in a wireless device (WD), the method comprising determining if a detected sequence received from a network node meets one of an acknowledgement (ACK) criterion and negative-acknowledgement (NACK) criterion using at least one bias value, the at least one bias value being based at last in part on a type of service associated with the detected sequence.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

| Abbreviation | Explanation |
| --- | --- |
| ACK | Acknowledgement |
| AMC | Adaptive Modulation and Coding |
| BS | Base Station |
| CQI | Channel Quality Indicator |
| E-UTRA | Evolved universal terrestrial radio access network |
| E-UTRA | Evolved universal terrestrial radio access |
| E-UTRA FDDE-UTRA | frequency division duplex |
| E-UTRA TDDE-UTRA | time division duplex |
| gNB | generalized Node B base station |
| HARQ | Hybrid Automatic Repeat Request |
| LTE | Long term evolution |
| NACK | Negative-Acknowledgement |
| NR | New Radio |
| PDSCH | Physical Downlink shared channel |
| PUSCH | Physical Uplink Shared Channel |
| PUCCH | Physical uplink control channel |
| RAT | Radio Access Technology |
| SINR | Signal-to-Interference Ratio |
| Tx | Transmitter |
| UE | User Equipment |
| URLLC | Ultra-Reliable Low Latency Communication |

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

The invention claimed is:

1. A network node configured to communicate with a wireless device, WD, the network node comprising processing circuitry configured to:
   determine whether a detected sequence meets one of an acknowledgement, ACK, criterion and a negative-acknowledgement, NACK, criterion using at least one bias value, the at least one bias value being based at least in part on a type of service corresponding to one or both of a first service and a second service associated with the detected sequence.

2. The network node of claim 1, wherein the at least one bias value includes an ACK bias value and a NACK bias value, where the ACK bias value is greater than the NACK bias value.

3. The network node of claim 1, wherein the at least one bias value includes a first ACK bias value for the first service, a first NACK bias value for the first service, a second ACK bias value for the second service and a second NACK bias value for the second service;
   the first ACK bias value being greater than the second ACK bias value; and
   the second ACK bias value being greater than the second NACK bias value.

4. The network node of claim 1, wherein the at least one bias value includes a first ACK bias value for the first service, a first NACK bias value for the first service, a second ACK bias value for the second service and a second NACK bias value for the second service;
   the first ACK bias value being greater than the first NACK bias value; and
   the first NACK bias value being greater than the second NACK bias value.

5. The network node of claim 1, wherein the first service is ultra reliable low latency communications, URLLC, and the second service is evolved mobile broadband, eMBB.

6. The network node of claim 1, wherein the ACK criterion is $Z_{ack} > Z_{Nack} + \delta_1$ and the NACK criterion is $Z_{Nack} > Z_{ack} + \delta_2$, where $\delta_1$ is the ACK bias value, $\delta_2$ is the NACK bias value, $Z_{ack}$ is a detected sequence correlated with a HARQ-ACK sequence and the received sequence, and $Z_{Nack}$ is a detected sequence correlated with a HARQ-NACK sequence and the received sequence.

7. The network node of claim 1, wherein the ACK criterion is $Z_{ack} > Z_{Nack} + \delta_1$ and the NACK criterion is $Z_{Nack} > Z_{ack} + \delta_2$, where $\delta_1$ is the ACK bias value, $\delta_2$ is the NACK bias value, $Z_{ack}$ is a detected sequence correlated with a HARQ-ACK sequence with the received sequence after equalization, and $Z_{Nack}$ is a detected sequence correlated with a HARQ-NACK sequence with the received sequence after equalization.

8. The network node of claim 1, wherein whether the detected sequence meets one of the ACK criterion and the NACK criterion is determined further using one or more detection thresholds that are applied for detecting physical uplink control channel, PUCCH, format 0 of fifth generation, 5G, wireless systems.

9. The network node of claim 1, wherein whether the detected sequence meets one of the ACK criterion and the NACK criterion is determined further using one or more detection thresholds that are applied for detecting physical uplink control channel, PUCCH, format 1 of fifth generation, 5G, wireless systems.

10. A method implemented in a network node, the method comprising:
    determining whether a detected sequence meets one of an acknowledgement, ACK, criterion and a negative-acknowledgement, NACK, criterion using at least one bias value, the at least one bias value being based at least in part on a type of service corresponding to one or both of a first service and a second service associated with the detected sequence.

11. The method of claim 10, wherein one of:
    (i) the at least one bias value includes an ACK bias value and a NACK bias value, where the ACK bias value is greater than the NACK bias value;
    (ii) the at least one bias value includes a first ACK bias value for the first service, a first NACK bias value for the first service, a second ACK bias value for the second service and a second NACK bias value for the second service;
        the first ACK bias value being greater than the second ACK bias value; and
        the second ACK bias value being greater than the second NACK bias value;

(iii) the at least one bias value includes a first ACK bias value for the first service, a first NACK bias value for the first service, a second ACK bias value for the second service and a second NACK bias value for the second service;
the first ACK bias value being greater than the first NACK bias value; and
the first NACK bias value being greater than the second NACK bias value.

12. The method of claim 11, wherein whether the detected sequence meets one of the ACK criterion and the NACK criterion is determined further using one or more detection thresholds that are applied for detecting physical uplink control channel, PUCCH, format 0 of fifth generation, 5G, wireless systems.

13. The method of claim 11, wherein whether the detected sequence meets one of the ACK criterion and the NACK criterion is determined further using one or more detection thresholds that are applied for detecting physical uplink control channel, PUCCH, format 1 of fifth generation, 5G, wireless systems.

14. The method of claim 10, wherein the first service is ultra reliable low latency communications, URLLC, and the second service is evolved mobile broadband, eMBB.

15. The method of claim 10, wherein the ACK criterion is $Z_{ack} > Z_{Nack} + \delta_1$ and the NACK criterion is $Z_{Nack} > Z_{ack} + \delta_2$, where $\delta_1$ is the ACK bias value, $\delta_2$ is the NACK bias value, $Z_{ack}$ is a detected sequence correlated with a HARQ-ACK sequence and the received sequence, and $Z_{Nack}$ is a detected sequence correlated with a HARQ-NACK sequence and the received sequence.

16. The method of claim 10, wherein the ACK criterion is $Z_{ack} > Z_{Nack} + \delta_1$ and the NACK criterion is $Z_{Nack} > Z_{ack} + \delta_2$, where $\delta_1$ is the ACK bias value, $\delta_2$ is the NACK bias value, $Z_{ack}$ is a detected sequence correlated with a HARQ-ACK sequence with the received sequence after equalization, and $Z_{Nack}$ is a detected sequence correlated with a HARQ-NACK sequence with the received sequence after equalization.

17. A wireless device, WD, configured to communicate with a network node, the WD comprising processing circuitry configured to:
determine whether a detected sequence received from the network node meets one of an acknowledgement, ACK, criterion and a negative-acknowledgement, NACK, criterion using at least one bias value, the at least one bias value being based at least in part on a type of service corresponding to one or both of a first service and a second service associated with the detected sequence.

18. The wireless device of claim 17, wherein the at least one bias value includes an ACK bias value and a NACK bias value, where the ACK bias value is greater than the NACK bias value.

19. The wireless device of claim 17, wherein the at least one bias value includes a first ACK bias value for the first service, a first NACK bias value for the first service, a second ACK bias value for the second service and a second NACK bias value for the second service;
the first ACK bias value being greater than the second ACK bias value; and
the second ACK bias value being greater than the second NACK bias value.

20. The wireless device of claim 17, wherein the at least one bias value includes a first ACK bias value for the first service, a first NACK bias value for the first service, a second ACK bias value for the second service and a second NACK bias value for the second service;
the first ACK bias value being greater than the first NACK bias value; and
the first NACK bias value being greater than the second NACK bias value.

21. The wireless device of claim 17, wherein the first service is ultra reliable low latency communications, URLLC, and the second service is evolved mobile broadband, eMBB.

22. The wireless device of claim 17, wherein the ACK criterion is $Z_{ack} > Z_{Nack} + \delta_1$ and the NACK criterion is $Z_{Nack} > Z_{ack} + \delta_2$, where $\delta_1$ is the ACK bias value, $\delta_2$ is the NACK bias value, $Z_{ack}$ is a detected sequence correlated with a HARQ-ACK sequence and the received sequence, and $Z_{Nack}$ is a detected sequence correlated with a HARQ-NACK sequence and the received sequence.

23. The wireless device of claim 17, wherein the ACK criterion is $Z_{ack} > Z_{Nack} + \delta_1$ and the NACK criterion is $Z_{Nack} > Z_{ack} + \delta_2$, where $\delta_1$ is the ACK bias value, $\delta_2$ is the NACK bias value, $Z_{ack}$ is a detected sequence correlated with a HARQ-ACK sequence with the received sequence after equalization, and $Z_{Nack}$ is a detected sequence correlated with a HARQ-NACK sequence with the received sequence after equalization.

24. A method implemented in a wireless device, WD, the method comprising:
determining whether a detected sequence received from a network node meets one of an acknowledgement, ACK, criterion and a negative-acknowledgement, NACK, criterion using at least one bias value, the at least one bias value being based at least in part on a type of service corresponding to one or both of a first service and a second service associated with the detected sequence.

* * * * *